United States Patent [19]

Jerabek et al.

[11] Patent Number: 4,540,725

[45] Date of Patent: Sep. 10, 1985

[54] PIGMENT GRINDING VEHICLE

[75] Inventors: Robert D. Jerabek, Glenshaw; Jeffrey G. Koren, Butler; Mark W. Johnson, Gibsonia, all of Pa.

[73] Assignee: PPG Industries, Inc., Pittsburgh, Pa.

[21] Appl. No.: 641,350

[22] Filed: Aug. 15, 1984

Related U.S. Application Data

[63] Continuation of Ser. No. 430,185, Sep. 30, 1982, abandoned.

[51] Int. Cl.³ .............................................. C08L 63/00
[52] U.S. Cl. .................................... 523/400; 523/351; 528/114; 528/120; 528/121; 564/287; 564/292; 564/294
[58] Field of Search ............... 523/400, 351; 528/120, 528/121, 407, 114; 260/404; 564/292, 294, 295

[56] References Cited

U.S. PATENT DOCUMENTS

| | | | |
|---|---|---|---|
| 3,468,816 | 9/1969 | Thompson et al. | 564/292 |
| 3,824,111 | 7/1974 | Jerabek | 106/308 N |
| 3,936,405 | 2/1976 | Sturni et al. | 260/29.2 EP |
| 3,975,346 | 8/1976 | Bosso et al. | 528/121 |
| 4,007,154 | 2/1977 | Schimmel et al. | 260/37 EP |
| 4,069,210 | 1/1978 | Schimmel | 528/407 |
| 4,186,124 | 1/1980 | Schimmel et al. | 260/37 EP |
| 4,255,553 | 3/1981 | Mizumura et al. | 528/114 |

OTHER PUBLICATIONS

NEO-FAT ® Fatty Acids Manual—by Armak Chemicals Division (1971), see pp. 15-17.

*Primary Examiner*—Lewis T. Jacobs
*Attorney, Agent, or Firm*—Godfried R. Akorli

[57] ABSTRACT

A quaternary ammonium group-containing material which is obtained from reacting a polyepoxide with an amine containing at least one acyclic group of about 8 to 30 carbon atoms and optionally an amine containing an alkylarylpoly ether moiety is disclosed. The resins are useful as pigment grinding vehicles and in the formulation of pigment paste, particularly pigment paste with high pigment loadings. When formulated into cationic electrodepositable compositions, the pigment grinding vehicles provide for cured electrodeposited coatings of excellent corrosion resistance, particularly over untreated and oily steel.

10 Claims, No Drawings

PIGMENT GRINDING VEHICLE

This application is a continuation of application Ser. No. 430,185, filed Sept. 30, 1982, abandoned.

BACKGROUND OF THE INVENTION

1. Field of the Invention

The present invention relates to a composition of matter useful as a pigment grinding vehicle and to pigment pastes formulated with such pigment grinding vehicles.

2. Brief Description of the Prior Art

In the formation of paints and especially electrodepositable paints, an important factor is the introduction of pigments into the paint. Pigments are typically ground with a grinding vehicle to form a pigment paste. The resultant paste is then combined with the film forming resin and optional ingredients to form the paint, giving the paint the proper color, or opacity, and application or film properties.

A problem with many pastes used for electrodeposition is the relatively low ratio of pigment to grinding vehicle which can be used. In cationic electrodepositable paints, pigment to grinding vehicle weight ratios are typically 5 to 1 or less. Pastes with higher ratios are not stable. Also, many pigment grinding vehicles do not contribute to, and may actually detract from some of the desirable properties of the resultant coating, particularly the property of corrosion resistance.

The present invention provides for pigment grinding vehicles which can be used to formulate a stable pigment paste having a relatively high pigment to grinding vehicle weight ratio. Also the instant pigment grinding vehicles enhance the corrosion resistance of the resultant coating.

SUMMARY OF THE INVENTION

In accordance with the foregoing, the present invention encompasses a quaternary ammonium group-containing material which is obtained from reacting:

(i) a polyepoxide having a 1,2-epoxy equivalency greater than one, and
(ii) an amine containing at least one organic group which contains an acyclic moiety of from about 8 to 30 carbon atoms, and preferably
(iii) an amine containing an alkylarylpolyether moiety of the formula:

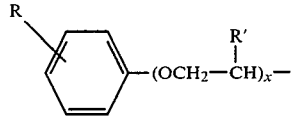

wherein R is an alkyl group containing from 1 to 30 carbon atoms, R' is hydrogen or lower alkyl containing from 1 to 5 carbon atoms, and x is equal to 3 to 20, under conditions sufficient to form the quaternary ammonium group.

The instant compositions of matter have been found useful as pigment grinding vehicles. Accordingly, the present invention encompasses pigment pastes containing the instant composition of matter as a grinding vehicle, and a pigment or pigments dispersed therewith. While these pastes can be useful in inks and many types of coatings, they are particularly useful in cationic electrodeposition compositions.

DETAILED DESCRIPTION OF THE INVENTION

The useful polyepoxides can be monomeric or polymeric compounds or mixture of compounds having a 1,2-epoxy equivalency greater than 1.0, preferably greater than 1 and up to 4.0. It is preferred that the organic polyepoxide be polymeric or resinous and have a 1,2-epoxy equivalent of about 100 to 500.

A preferred class of polyepoxides are the polyglycidyl ethers of polyphenols, such as bisphenol A. These may be prepared, for example, by etherification of a polyphenol with epichlorohydrin or dichlorohydrin in the presence of an alkali. The phenolic compound may be bis(4-hydroxyphenyl) 2,2-propane; 4,4'-dihydroxybenzophenone; bis(4-hydroxyphenyl)1,1-ethane; bis(4-hydroxyphenyl)1,1-isobutane; bis(4-hydroxy-tertiarybutylphenyl)2,2-propane; bis(2-hydroxy-naphthyl)methane; 1,5-hydroxy-naphthalene; or the like. Another quite useful class of polyepoxides are produced similarly from novolak resins or similar polyphenol resins.

Also suitable are the similar polyglycidyl ethers of polyhydric alcohols which may be derived from such polyhydric aliphatic alcohols as ethylene glycol, diethylene glycol, triethylene glycol, 1,2-propylene glycol, 1,4-butylene glycol, 1,5-pentanediol, 1,2,6-hexanetriol, glycerol, bis-(4-hydroxycyclohexyl)2,2-propane, and the like.

There can also be employed polyglycidyl esters of polycarboxylic acids which are produced by the reaction of epichlorohydrin or a similar epoxy compound with an aliphatic or aromatic polycarboxylic acid, such as oxalic acid, succinic acid, glutaric acid, terephthalic acid, 2,6-naphthalene dicarboxylic acid, dimerized linoleic acid and the like. Examples are diglycidyl adipate and diglycidyl phthalate.

Also useful are polyepoxides derived from the epoxidation of an olefinically unsaturated alicyclic compound. These polyepoxides are nonphenolic and obtained by epoxidation of alicyclic olefins, for example, by oxygen and selected metal catalyst, by perbenzoic acid, by acid-aldehyde monoperacetate or by peracetic acid.

The amines useful herein are preferably tertiary amines and are those which are capable of reacting with and opening the epoxide moiety in the presence of acid and/or water. The useful amines contain at least one lower alkyl group of from 1 to 4 carbon atoms, preferably methyl, and at least one organic group which contains an acyclic moiety of from about 8 to 30, preferably 12 to 18 carbon atoms. Preferably, two of the groups are methyl and the other one is an organic group containing an acyclic group of from about 8 to 30, preferably 12 to 18 carbon atoms.

The term "organic group" as used herein is intended to encompass saturated and unsaturated groups, as well as substituted and unsubstituted hydrocarbyl groups, provided that the substituent does not adversely affect the reaction of the tertiary amine or the performance of the instant compositions derived therefrom. Examples of substituents would be hydroxy groups and alkoxy groups. Also, the acyclic group can contain moieties in the chain such as ether and ester groups.

Examples of the tertiary amines are those represented as:

wherein $R_1$, $R_2$, and $R_3$ are alkyl groups of which at least one group contains, each independently, from about 8 to 30 carbon atoms, and at least one group is a lower alkyl containing from 1 to 4 carbon atoms, preferably methyl. Preferably, one of the alkyl groups contains an acyclic moiety containing from about 8 to 30, and more preferably from about 12 to 18 carbon atoms, and two of the groups are lower alkyl containing from 1 to 4 carbon atoms, preferably methyl. Illustrative examples of the useful fatty amines are N-octadecyldimethylamine, N-tetradecyldimethylamine, N-octyldimethylamine, N-decyldimethylamine, N-dodecyldimethylamine and N-nonyldimethylamine. It is expected that heterocyclic amines in accordance with this invention will be useful herein.

The amine containing an alkylarylpolyether moiety is preferably an organic tertiary amine. The organic amine contains an alkylarylpolyether moiety, typical of which is represented by the following structural formula:

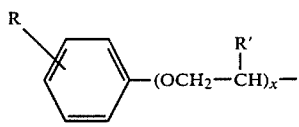

where R is an alkyl radical containing from 1 to 30 carbon atoms and R' is hydrogen or lower alkyl containing from 1 to 5 carbon atoms and x is equal to 3 to 20. Preferably, R is a branched alkyl group containing secondary, tertiary, or both secondary and tertiary carbon atoms. In the most preferred embodiment, R is octyl.

In the above structural formula, the aryl radical is represented by the phenyl ring. It should be appreciated, however, that other aryl radicals such as derived from naphthalene, anthracene, and phenanthrene can be used.

In one embodiment of the invention, the organic amine containing an alkylarylpolyether moiety can be prepared by reacting an alkylarylpolyether which contains an active hydrogen such as hydroxyl with an organic diisocyanate to form a half-capped isocyanate product. An organic amine containing active hydrogens such as a hydroxyl-containing tertiary amine can then be reacted with a half-capped isocyanate to form the desired adduct. In a preferred embodiment of the invention, toluene diisocyanate is half-capped with an octyl phenol-ethylene oxide adduct having the following structural formula:

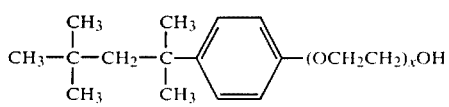

where x is equal to 12 to 13. The half-capped adduct is then fully capped with dimethylethanolamine to form a tertiary amine adduct containing an alkylarylpolyether moiety which also contains urethane linkages.

The equivalent ratio of polyepoxide:amine containing at least one lower alkyl group and 1 acyclic group of 8 to 30 carbon atoms: amine containing alkylarylpolyether moieties can vary within the following ranges —1:0.4–1.0:0 to 0.6, Preferably 1:0.4–0.9:0.1 to 0.6, and the equivalent ratio of polyepoxides to total amine being equal to or greater than 1. The equivalents are based on epoxy functionality and amine functionality, with the amines being considered monofunctional.

With tertiary amines, the polyepoxides can be reacted by simply mixing the two together, preferably in the presence of a controlled amount of water. The amount of water employed should be that amount of water which allows for smooth reaction of epoxy groups. Typically, the water is employed on the basis of about 1.0 to about 16, preferably 2 to 10 moles of water per equivalent of amine nitrogen.

The reaction proceeds at room temperature in most cases and, in some cases, exothermically, so that moderate cooling may be necessary. In some cases, moderately elevated temperature can be used and is preferred. Typically, the reaction is conducted between about 50°C. and 100° C. The reaction may be conducted in the presence of a solvent if desired. If a solvent is employed, preferably it is capable of being used in the ultimate composition which is formed. For example, alcohols, ketones and glycol ethers may be used.

The reaction of the tertiary amine(s) and polyepoxide is usually conducted in the presence of acid and/or water under conditions sufficient to form the quaternary ammonium salt or hydroxide. The presence of water is preferred to moderate the reaction. The presence of acid is preferred for pigment grinding. The amine(s) can be first neutralized with acid to form the amine salt followed by reaction with the polyepoxide. Alternately, the polyepoxide, amine(s) and acid can be reacted simultaneously or the amine(s) and epoxide can be first reacted followed by acidification.

The useful acids can be organic or inorganic acids preferably those having a pKa less than 6. Preferably, the acid is water soluble, and preferably it is organic. Examples of acids include phosphoric acid, acetic acid and lactic acid.

To form the quaternary ammonium group, the use of tertiary amine(s) is preferred. However, quaternary ammonium base group-containing resins can be prepared with primary and secondary amines. This can be accomplished by first reacting the primary or secondary amine(s) with the polyepoxide. Reaction is continued until a tertiary amine is formed. Further reaction with unreacted epoxy which may be from the original polyepoxide or from externally added epoxy such as propylene oxide, is continued to form the quaternary ammonium base. When using primary or secondary amines, some precautions should be taken to avoid gelling of the resin. For example, when quaternization is effected through the polyepoxide moiety, the molecular weight should be low and/or the epoxy equivalent weight high to avoid gelling. Preferably, quaternization takes place from externally added epoxy. Besides propylene oxide mentioned above, the glycidyl esters and ethers of fatty acids and alcohols such as the glycidyl ester of versatic acid can be used and their use is preferred for superior pigment grinding properties.

Besides quaternizing with additionally added epoxy material, alkylating agents such as dimethylsulfate and methyl iodide can be used, but their use is less preferred, particularly in preparing electrodeposition compositions.

The compositions of the invention have been found to be very effective as pigment grinding vehicles. The grinding vehicles are used to prepare pigment pastes containing one or more pigments which are ground with the grinding vehicle. The pigment pastes are prepared by grinding or dispersing the pigment into the grinding vehicle in a manner well known in the art. The pigment paste comprises as essential ingredients the quaternary ammonium pigment grinding vehicle prepared as described above and at least one pigment; however, the paste may, in addition, contain optional ingredients such as plasticizers, wetting agents, surfactants or defoamers.

Grinding is usually accomplished by the use of ball mills, sand mills, Cowles dissolvers, continuous attritors and the like until the pigment has been reduced to the desired size, preferably has been wet by and dispersed by the grinding vehicle. After grinding, the particle size is generally in the range of 10 microns or less.

Preferably, grinding is conducted in an aqueous dispersion of the vehicle. The amount of water present in the aqueous grind should be sufficient to produce a continuous aqueous phase. The aqueous grind usually contains about 30–70 percent total solids. The use of more water merely reduces the effective capacity of the mill and, while less water can be employed, higher resultant viscosity may create problems in certain instances.

One of the advantages of the pigment grinding vehicles of the present invention is their ability to be formulated into pastes with high pigment to grinding vehicle weight ratios. Depending upon the pigment to be dispersed, typical weight ratios of at least 10 to 1, preferably higher, that is, 15 to 40:1, can be attained without the paste settling or separating when stored for 7 days at 120° F. (49° C.). Pigment pastes with lower pigment grinding vehicle weight ratios that are as low as 1 to 1 can, of course, be prepared.

Pigments which may be employed in the practice of the invention are pigments well known in the art. Generally, titanium dioxide is the sole or chief white pigment; other white pigments and/or extender pigments including antimony oxide, zinc oxide, basic lead carbonate, basic lead sulfate, barium carbonate, China clay, calcium carbonate, aluminum silicate, silica, magnesium carbonate, magnesium silicate, among others, may be used. Colored pigments may also be employed, for example, cadmium yellow, cadmium red, carbon black, phthalocyanine blue, chrome yellow, toluidine red, hydrated iron oxide, among others.

The pigment paste can be combined with a film forming resin to form a paint. The film forming resin can be a cationic resin known in the art for electrodeposition. These resins are well known in the art and need not be described in detail. Examples of suitable resins include tertiary amine salt-containing resins such as those described in U.S. Pat. No. 4,148,772 assigned to PPG Industries, Inc., the assignee of the present invention; and quaternary ammonium salt-containing resins such as those described in U.S. Pat. No. 3,839,252 to Bosso et al. The portions of these references which describe suitable electrodepositable resins for cationic electrodeposition are hereby incorporated by reference.

Enough of the pigment paste is used so that the final electrodepositable composition (electrodepositable resin plus pigment paste) has the properties required for electrodeposition. In most instances, the final electrodepositable composition has a pigment-to-binder (electrodepositable resin plus pigment dispersant) ratio of between about 0.05 to about 0.6.

For electrodeposition, a bath containing about 5–25 percent by weight solids, that is, pigment plus resinous vehicle, is usually employed. This aqueous composition is then placed in contact with an electrically conductive anode and an electrically conductive cathode in an electric circuit. While in contact with the bath containing the coating composition, an adherent film of the coating composition is deposited on the cathode.

The conditions under which the electrodeposition is carried out are, in general, similar to those used in electrodeposition of other types of coatings. The applied voltage may be varied greatly and can be, for example, as low as one volt or as high as several thousand volts, although typically between 50 volts and 500 volts are usually employed. The current density is usually between about 0.25 ampere and 15 amperes per square foot and tends to decrease during electrodeposition.

The method of the invention is applicable to the coating of any conductive substrate and especially metal, such as steel, aluminum, copper and the like. After deposition, the coating is cured at elevated temperatures by any convenient method, such as in baking ovens or with banks of infrared heat lamps. Curing temperatures of at least 100° C., and usually 125° to 185° C. for at least 10 minutes and usually for about 10 to 30 minutes are employed.

One of the advantages of the pigment grinding vehicles of the present invention is the excellent corrosion resistance they impart to cationic electrodeposited coatings over untreated steel or oily steel substrates, even when the coatings are cured at relatively low temperatures, i.e. 175° C. and below, typically 160°–175° C. Illustrating the invention are the following examples which are not to be construed as limiting the invention to their details. All parts and percentages in the examples, as well as throughout the specification, are by weight, unless otherwise specified.

Example I

This example shows the preparation of a quaternary ammonium salt group-containing material formed from reacting in the presence of acetic acid, a polyglycidyl ether of bisphenol A with N-dodecyldimethylamine.

| Ingredients | Parts by Weight in Grams |
| --- | --- |
| ARMEEN DM18D[1] | 418.5 |
| Glacial acetic acid | 84.6 |
| Deionized water | 35.25 |
| EPON 828[2] | 265 |
| 2-Butoxyethanol | 378.3 |

[1]N—octadecyldimethylamine available from Armak Chemical Div.
[2]Polyglycidyl ether of bisphenol A having an epoxy equivalent of 188 commercially available from Shell Chemical Co.

The ARMEEN DM18D, 100 grams of the 2-butoxyethanol and the deionized water were charged to a properly equipped reaction vessel, heated to 50° C., followed by adding the acetic acid. The resultant mixture was allowed to react for a period of 15 minutes over a temperature range of 45° to 55° C. Thereafter, at about 51° C., the EPON 828 and the remaining 2-butoxyethanol were added and the mixture heated to 75° C., and held over a temperature range of 75° to 85° C. for 4½ hours. The resultant mixture was cooled and stored.

Example II

This example shows the preparation of a quarternary ammonium salt group-containing material formed from reacting in the presence of lactic acid a polyglycidyl ether of bisphenol A with N-octadecyldimethylamine and an amine containing alkyarylpolyether moieties.

| Ingredients | Parts by Weight in Grams |
| --- | --- |
| MONDUR TDS[1] | 87 |
| TRITON X-102[2] | 386 |
| Dimethylethanolamine | 42 |
| ARMEEN DM18D | 141 |
| 88% Lactic acid | 111 |
| Deionized water | 88 |
| EPON 828 | 220 |
| 2-Butoxyethanol | 443 |

[1]2,4-Toluene diisocyanate, available from Mobay Chemical Corp.
[2]An alkylarylpolether of the structure

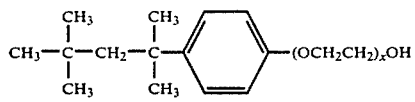

where x = 12 to 13, commercially available from Rohm and Haas Company.

The MONDUR TDS was charged to a properly equipped reaction vessel, stirred and provided with a nitrogen blanket. Addition of the TRITON X-102 was begun and continued by dripping it into the reaction vessel at such a rate that the reaction temperature stayed over the range of 25°-35° C. Upon completion of the addition of the TRITON X-102, the reaction mixture was allowed to react for 30 minutes over a temperature range of 30°-40° C., and then heated to 50° C. Thereafter, the dimethylethanolamine was dripped into the reaction vessel with a resulting exotherm to 73° C. Upon completion of this addition, the reaction mixture was allowed to react for 45 minutes over a temperature range of 55°-65° C. (An infrared scanning showed that all the isocyanate had reacted.) The ARMEEN DM18D was melted and then added to the reaction mixture at 58° C. This was followed by addition of the 88% lactic acid with a resulting exotherm to 66° C. The reaction mixture was stirred for 30 minutes over the temperature range of 50°-60° C. The deionized water was added and the reaction mixture held for 60 minutes over the temperature range of 50°-60° C. Thereafter, at 46° C., the EPON 828 and 2-butoxyethanol were added to the reaction which exothermed to 70° C. The reaction mixture was held for 4½ hours over the temperature range of 70°-75° C. to complete the reaction. The reaction mixture was cooled and stored.

Example III

This example illustrates the preparation of a quaternary ammonium salt group-containing material formed from reacting in the presence of lactic acid a polyglycidyl ether of an aliphatic polyol with N-octadecyldimethylamine and an amine containing alkylarylpolyether moieties. The Example also shows the use of these resins as pigment grinding vehicles.

| Ingredients | Parts by Weight in Grams |
| --- | --- |
| MONDUR TDS | 87 |
| TRITON X-102 | 386 |
| Dimethylethanolamine | 42 |
| ARMEEN DM18D | 141 |
| 88% Lactic Acid | 111 |
| Deionized water | 88 |

| Ingredients | Parts by Weight in Grams |
| --- | --- |
| ARALDITE RD-2[1] | 153 |
| 2-Butoxyethanol | 407 |

[1]Diglycidyl ether of 1,4-butanediol, available from Ciba-Geigy Co.

The above ingredients were reacted in essentially the same manner as described in Example II. The resultant composition was employed as a pigment grinding vehicle in preparing a pigment paste. The following were used in the preparation:

| Ingredients | Parts by Weight in Grams |
| --- | --- |
| Aluminum silicate clay | 446.4 |
| Lead silicate | 72.1 |
| Carbon black | 57.5 |
| Dibutyltin oxide | 20.1 |
| Deionized water | 440.5 |
| Grinding vehicle | 60.5 |

The grinding vehicle was blended with the above pigments and the deionized water to form a slurry which was ground in a Jiffy mill for 2 hours to a Hegman 7+ grind.

A cationic paint comprising a blend of the above pigment paste and an electrodepositable resinous film-forming composition was prepared as follows. The electrodepositable resinous film-forming composition was prepared with the following:

| Ingredients | Parts by Weight in Grams |
| --- | --- |
| EPON 829[1] | 727.6 |
| PCP-0200 | 268.4 |
| Xylene | 36.1 |
| Bisphenol A | 197.8 |
| Benzyldimethylamine | 3.8 |
| Capped isocyanate crosslinker[2] | 933.5 |
| Diketimine derived from diethylene triamine and methyl isobutyl ketone (73% solids in methyl isobutyl ketone) | 73.4 |
| N—methylethanolamine | 59.1 |
| 2-Hexoxyethanol | 76.5 |
| Acetic acid | 33.5 |
| Cationic dispersant[3] | 29.4 |
| Deionized water | 1793.1 |

[1]Epoxy resin solution made from reacting epichlorohydrin and bisphenol A having an epoxy equivalent of 188, commercially available from Shell Chemical Co.
[2]Polyurethane crosslinker formed from half-capping toluene diisocyanate (80/20 2,4-/2,6-isomer mixture) with 2-ethylhexanol and reacting this product with trimethylolpropane in a 3:1 molar ratio. The crosslinker is present as a 70 percent solids solution in a 90/10 mixture of methyl isobutyl ketone and n-butanol.
[3]The cationic dispersant was prepared by blending 120 parts of an alkyl imidazoline commercially available from Geigy Industrial Chemicals as GEIGY AMINE C, 120 parts by weight of an acetylenic alcohol commercially available from Air Products and Chemicals Inc. as SURFYNOL 104, 120 parts by weight of 2-butoxyethanol, 221 parts by weight of deionized water and 19 parts of glacial acetic acid.

The EPON 829, PCP-0200 and xylene were charged to a reaction vessel and heated with a nitrogen sparge to 210° C. The reaction was held at reflux for about ½ hour to remove water azeotropically. The reaction mixture was cooled to 150° C. and the bisphenol A and 1.6 parts of the benzyldimethylamine (catalyst) added. The reaction mixture was heated to 150°-190° C. and held at this temperature for about 1½ hours and then cooled to 130° C. The remaining portion of the benzyldimethylamine catalyst was added and the reaction mixture held at 130° C. for 2½ hours until a reduced Gardner-Holdt viscosity (50 percent resin solids solution in 2-ethoxyethanol) of P was obtained.

The polyurethane crosslinker, the diketimine derivative and the N-methylethanolamine were then added and the temperature of the reaction mixture brought to 110° C. and held at this temperature for 1 hour.

The 2-hexoxyethanol was added and the reaction mixture was dispersed in water by adding the reaction mixture to a mixture of the acetic acid, deionized water and the cationic dispersant. This dispersion was diluted to 32 percent solids with deionized water and vacuum stripped to remove organic solvent to give a dispersion having a solids content of 36 percent.

The above electrodepositable composition and pigment pastes were blended to form a cationic paint having a pigment to binder ratio of 0.2 and a bath solids content of 20 percent. The paint had a conductivity of about 1280 μmhos/cm after ultrafiltration, and pH was adjusted with acetic acid to 6.2. Steel panels were electrodeposited in the paint at 275 volts for 2 minutes at a paint temperature of 25° C. The coated panels were baked at 170° and 182° C. for 20 minutes to obtain hard, glossy and smooth coatings having a film thickness of about 0.4 to 0.7 mils.

Comparative Example

For comparison, steel panels were electrocoated with a paint similar to the paint of Example III with the exception of the pigment grinding vehicle used. The pigment grinding vehicle is the reaction product of EPON 828 and a tertiary amine salt containing blocked isocyanate groups. The vehicle is described in Example II of U.S. Pat. No. 4,007,154. The pigments of Example III were ground with this vehicle to form the paste.

The comparative paint had a pigment to binder ratio of 0.2 and a solids content of 20 percent by weight as with the paint of Example II. Steel panels were electrodeposited in the paint at 275 volts for 2 minutes at a paint temperature of 25° C. The coated panels were baked at 171° and 182° C. for 20 minutes to obtain hard, glossy, smooth coatings having a film thickness of about 0.4 to 0.5 mils.

Panels coated with the cured paint of Example III were compared with panels coated with the cured paint of the comparative example. The paint of Example III was adjusted with 2-butoxyethanol (36 grams per gallon of paint) so as to equal the solvent content of the paint of the Comparative Example.

The comparison was between corrosion resistance properties. The coated panels were scribed with an "X" mark and placed in a salt spray chamber at 100° F. (38° C.) at 100 percent by weight relative humidity atmosphere of 5 percent by weight aqueous sodium chloride solution for a period of 14 days. After 14 days, the creepage from the scribe mark was measured and reported as shown in Table I below.

TABLE I

| Electrocoat Paint Containing: | Scribe Creepage in microns At: | |
|---|---|---|
| | 182° C./20 minutes | 171° C./20 minutes |
| Evaluation of Salt Spray Testing on Cold Rolled Steel | | |
| Comparative Example | 1.6 | 4.7 |
| Example III | 0.8 | 2.3 |
| Evaluation of Salt Spray Testing on Oily Steel | | |
| Comparative Example | 7.8 | 9.4 |
| Example III | 4.7 | 4.7 |

The above specific illustrations and other descriptions herein are not intended to limit the scope of the invention. Instead, it is intended that the invention include all the variations and modifications falling within the scope of the appended claims.

What is claimed is:

1. A quaternary ammonium group-containing material which is obtained from reacting:
   (i) a polyepoxide having a 1,2-epoxy equivalency greater than one,
   (ii) an amine containing at least one organic group which contains an acyclic moiety of about 8 to 30 carbon atoms, and
   (iii) an amine containing an alkylarylpolyether moiety of the formula:

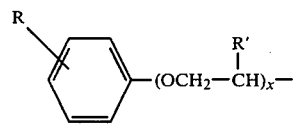

wherein R is an alkyl group containing from 1 to 30 carbon atoms, R' is hydrogen or lower aklyl containing from 1 to 5 carbon atoms and x is equal to 3 to 20, under conditions sufficient to form the quaternary ammonium group; the equivalent ratio of (i):(ii):(iii) is about 1:0.4 to 1:0.1 to 0.6 and the equivalent ratio of (i):(ii)+(iii) is equal to or greater than 1.

2. The quaternary ammonium group-containing material of claim 1, wherein the polyepoxide is a polyglycidyl ether of a polyol.

3. The quaternary ammonium group-containing material of claim 2, wherein the polyepoxide is a polyglycidyl ethter of bisphenol A, having an epoxy equivalent of about 100 to 500.

4. The quaternary ammonium group-containing material of claim 1, wherein the amine is of the structure:

wherein $R_1$, $R_2$ and $R_3$ are alkyl groups of which at least one group contains from about 8 to 30 carbon atoms, and at least one group is methyl.

5. The quaternary ammonium group-containing material of claim 4 wherein two groups are methyl and one group contains from 8 to 30 carbon atoms.

6. The quaternary ammonium group-containing material of claim 4, wherein the amine is N-octadecyldimethylamine.

7. The quaternary ammonium group-containing material of claim 1, wherein the amine containing an alkylarylpolyether moiety is derived from the reaction product of:
   (i) an alkylarylpolyether alcohol,
   (ii) an organic diisocyanate, and
   (iii) a hydroxyl-containing tertiary amine.

8. A pigment grinding vehicle comprising the quaternary ammonium group-containing material as recited in claim 1 which is at least partially acid-neutralized.

9. A pigment paste comprising:
   (A) the grinding vehicle of claim 8,
   (B) a pigment dispersed in (A).

10. A pigment paste of claim 9 wherein the weight ratio of (B) to (A) is at least 10:1.

* * * * *